United States Patent [19]

Sawyer

[11] 4,137,159
[45] Jan. 30, 1979

[54] APPARATUS AND METHOD FOR DELIQUIFYING MATERIAL

[75] Inventor: Harold T. Sawyer, Pacific Palisades, Calif.

[73] Assignee: Vernon D. Beehler, Los Angeles, Calif. ; a part interest

[21] Appl. No.: 836,537

[22] Filed: Sep. 26, 1977

Related U.S. Application Data

[63] Continuation-in-part of Ser. No. 573,043, Apr. 30, 1977, abandoned.

[51] Int. Cl.$^2$ ............................................ B01D 35/20
[52] U.S. Cl. ....................................... 210/19; 210/77; 210/384; 210/388; 210/DIG. 18; 210/DIG. 22; 74/61; 162/209; 209/308; 198/752
[58] Field of Search .................. 74/61, 87; 134/1; 162/208, 209, 314, 355; 198/631, 752, 766; 209/308; 210/19, 77, 79, 384, 388, 393, DIG. 18, DIG. 22

[56] References Cited

U.S. PATENT DOCUMENTS

| | | | |
|---|---|---|---|
| 1,856,777 | 5/1932 | Mollen | 162/355 |
| 1,917,098 | 7/1933 | Cofin | 162/355 |
| 2,766,881 | 10/1956 | Westervelt | 210/19 |
| 2,778,231 | 1/1957 | La mort de Gail | 74/87 |
| 3,122,930 | 3/1964 | Allen et al. | 74/87 |
| 3,158,038 | 11/1964 | Goodman | 74/87 |
| 3,232,828 | 2/1966 | Ouellet | 162/355 |
| 3,463,321 | 8/1969 | van Ingen | 210/DIG. 22 |
| 3,489,644 | 1/1970 | Rhine | 162/208 |
| 3,491,881 | 1/1970 | Winquist | 74/61 |
| 3,549,487 | 12/1970 | Clark | 162/209 |
| 3,772,923 | 11/1973 | Burt | 198/220 DB |

Primary Examiner—Charles N. Hart
Assistant Examiner—Ernest G. Therkorn

[57] ABSTRACT

In a substantially conventional system for receiving and conveying a fluid suspension of material there is an endless porous belt screen on which the material is spread and a tray beneath the belt to catch liquid which passes through the belt. A suction box beneath the belt near the area of deposition draws off some liquid. Superimposed on the conventional system is a resonant frequency energy source in the form of a roll assembly consisting in part of an outer shell in the form of an exterior cylindrical roll supported on shock mounts and in constant engagement with the underside of the belt. The exterior cylindrical roll is driven at a circumferential speed equal to the linear speed of travel of the belt. Within the exterior cylindrical roll is a frequency generator mass in the form of a generator roll sub-assembly embodying an eccentric coupling driven by an oppositely rotating shaft which oscillates the generator roll sub-assembly to generate a sinusoidal force motion in the sonic range, whereby to set up in the exterior cylindrical roll the belt sections adjacent thereto and the material on the belt a resonant condition which in turn generates accoustical vaporous cavitation to break surface tension of the liquid and the material thereby to augment the quantity of liquid passing through the belt.

17 Claims, 11 Drawing Figures

APPARATUS AND METHOD FOR DELIQUIFYING MATERIAL

This is a continuation-in-part of Application Serial No. 573,043 filed Apr. 30, 1977, now abandoned.

One of the major costs and production efficiency problems that confront certain major processing industries, such as paper making and mineral and chemical processing for example, has been the limited ability to extract a significant amount of fluids during processing and before drying. The conventional use of a suction box in paper making or use of rotary vacuum dryers in the mineral and chemical processing industries, has proven helpful since approximately 30 percent of the fluids are extracted by this means in the case of mineral and chemical processing. This problem is additionally troublesome because mineral and chemical bearing fluids not extracted or recovered from the denuded ores or chemical residue prior to drying are lost to the tailing dumps and cannot as a result be returned to the process. This represents a significant loss in mineral or chemical value. Some of the mineral bearing fluids that are lost in this manner contain metals such as gold, copper, and uranium, in the gold, copper and uranium mineral processing industries.

It has been further established that the installation of a second suction box for extraction of fluid will not extract sufficient additional fluid because the fluid has been absorbed within the material.

In the paper making process, any additional fluid extraction would result in extensive cost savings during the drying process. Since the drying time generally is a limiting factor in the production speed of making paper, any additional extraction of fluid before the final drying cycle would in itself permit the paper machine to operate at higher production speeds resulting in substantial reduction in the cost of the operation.

What is urgently needed is implementation of new process techniques and supporting new technology to provide a device which furthers the reduction of energy required in the drying process, which furthers the reduction of minerals lost to the tailing dumps and which attains a higher extraction efficiency than has previously been possible.

It is therefore among the objects of the invention to provide a new and improved method and apparatus for increasing the amount of dewatering of a conveyor carried liquid suspension of material over and above the rate now possible with present methods and apparatus. Another object of the invention is to provide a new and improved method and apparatus to decrease the amount of energy required for liquid extraction of a conveyor carried pulp solution or slurry.

Still another object of the invention is to provide a new and improved method and apparatus capable of increasing the extraction of metal bearing fluids from denuded ores for ultimate return to the process. Further among the objects of the invention is to provide a new and improved method and machine for increasing the amount of extraction of chemical fluids from the residue in chemical processing for return to the process. Still another object of the invention is to provide a new and improved machine and process for the utilization of cavitation energy as a means to induce a vacuuming action on the belt or screen surface and to break the surface tension that exists between the material and the absorbed liquid that has been absorbed within the material, and to thus release the fluid which is in turn drawn down to the screen surface.

With these and other objects in view, the invention consists of the construction, arrangement, and combination of the various parts of the device, whereby the objects contemplated are attained, as hereinafter set forth, pointed out in the appended claims and illustrated in the accompanying drawings.

The method and apparatus herein disclosed is applicable to a variety of processes wherein liquid is extracted from a pourous belt transported liquid like mass and has been shown and made the subject of discription by way of example of how the novel subject matter of the invention is applied to a specific system of liquid extraction.

Figure 1:
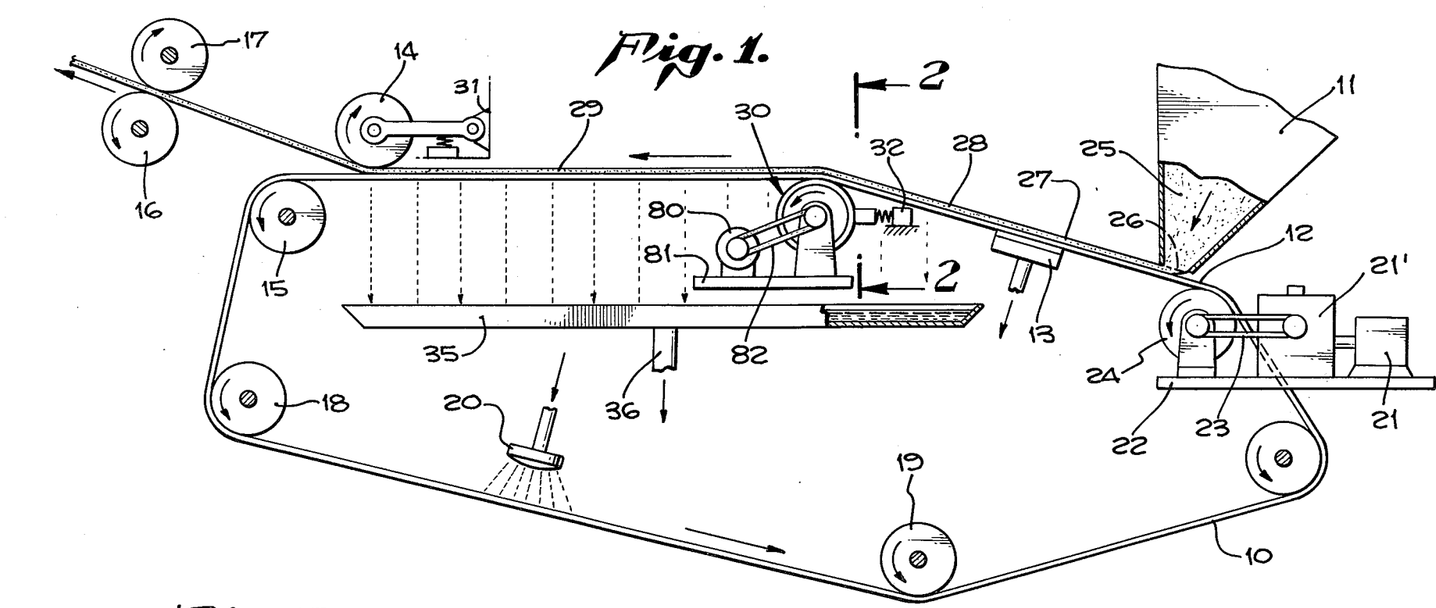
FIG. 1 is a schematic representation of one form of apparatus in which the method can be practiced.

In an embodiment of the invention chosen by way of illustration there is shown in FIG. 1 a schematic arrangement of a conventional paper machine consisting essentially of a continuous moving closed loop open mesh conveyor belt or screen 10, a pulp feed box 11 at the feed end 12, a suction box 13, a pick up roll 14, upstream of an idler roll 15, and compression rolls 16 and 17. Between idler rolls 18 and 19 is a water spray screen cleaner 20 directed downwardly in the embodiment shown. For driving the screen there is a motor 21 and gear reducer 21' on a suitable support 22 which, acting through a belt drive 23 rotates a drive roll 24. The belt 10, held in tension under appropriate conventional means, passes over an appreciable portion of the surface of the drive roll 24 sufficient to have the drive roll frictionally engage the reverse side of the belt and drive it at a speed appropriate to the process.

In the chosen embodiment where a paper making machine has been used for illustrative purposes pulp 25 in a substantially liquid state flows from an opening 26 at the bottom of the box 11 and is deposited as a web 27 on the belt 10.

The suction box 13 draws off a substantial amount of liquid leaving a web section 28. A sinusoidal frequency generator assembly indicated generally by the reference character 30 adapted to an additional supplemental fluid extraction operation is located down stream of the suction box 13 and intermediate the web section 28 and a succeeding web section 29. For removing extracted fluid from the roll surface there is provided a roll surface wiper 32.

The pick up roll 14, following conventional practice, which is typically mounted on a support 31, serves to lift the web section 29 from engagement with the belt 10 whereafter the web travels between the conventional compression rolls 16 and 17 on its way to the dryers.

The generator assembly 30 and parts accessory to it, by reason of the construction and arrangement of parts, and in combination with belt screen attachment comprise the subject matter of the disclosure which is novel as compared to conventional apparatus for deliquifying a belt carried fluid material. Essential portions of the generator assembly are illustrated in FIGS. 3 through 10 inclusive.

Figure 2:
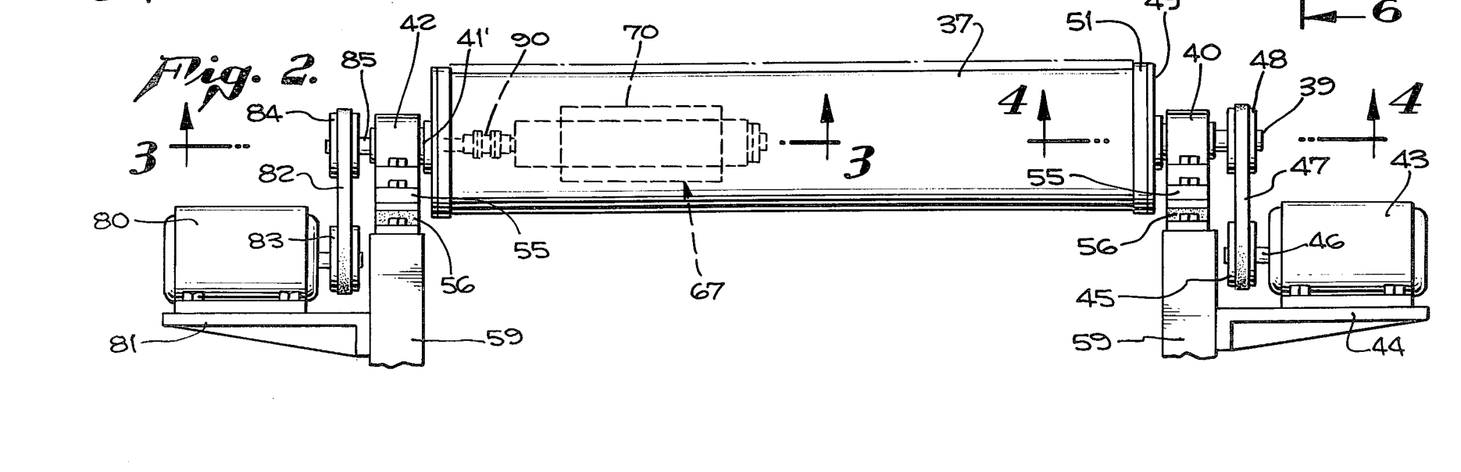
FIG. 2 is a transverse elevational view on the line 2—2 of FIG. 1.

The generator assembly 30, as can be seen to good advantage in FIG. 2, consists of a resonant frequency exterior roll in the form of a roll 37, and an interiorly mounted sinusoidal frequency generator roll 38. There are two conversely operating parts, namely the belt contacting cylindrical roll 37 and the interior mounted generator frequency mass in the form of a generator tube or roll 38. The generator assembly 30 also includes a driven shaft 39 extending outwardly on the right hand side as viewed in FIG. 2. The driven shaft 39 is rotatably supported in a bearing 41 carried by a pillow block 40.

The entire length and circumference of the exterior cylindrical roll 37 is smooth surfaced. Furthermore, by having the web sections 28 and 29 disposed at a slight angle with respect to each other there is a certain wraparound effect of the belt 10 and web 27 on the exterior of the cylindrical shell 37, that can create an area of contact from 20% to 30% of the area of the roll surface.

Although it is obvious from a visual point of view it is worthy of note that the axis of rotation of the cylindrical shell is parallel to the transverse axis of the web 27 and the linear speed of the roll surface should be the same as the linear speed of travel of the web, when in operation.

The frequency generator or generator tube 38, transmits a sinusoidal force at sufficient amplitude to excite the cylindrical shell 37 into one of its modes of natural frequency or resonance by structural design and which in turn by physical contact to the porous belt screen 10 excites the screen 10, and web sections 28 and 29, into one of their modes of natural frequency or resonance. The resonant energy produced and transmitted by the resonant screen 10 produces an intense state of vaporous cavitation with the fluid material of the webs thus breaking the surface tension of the absorbed liquid to the material causing the extracted liquid to be released to belt 10 through which it passes and is collected in a tray 35 to be passed on to an accumulator station (not shown).

Figure 3:
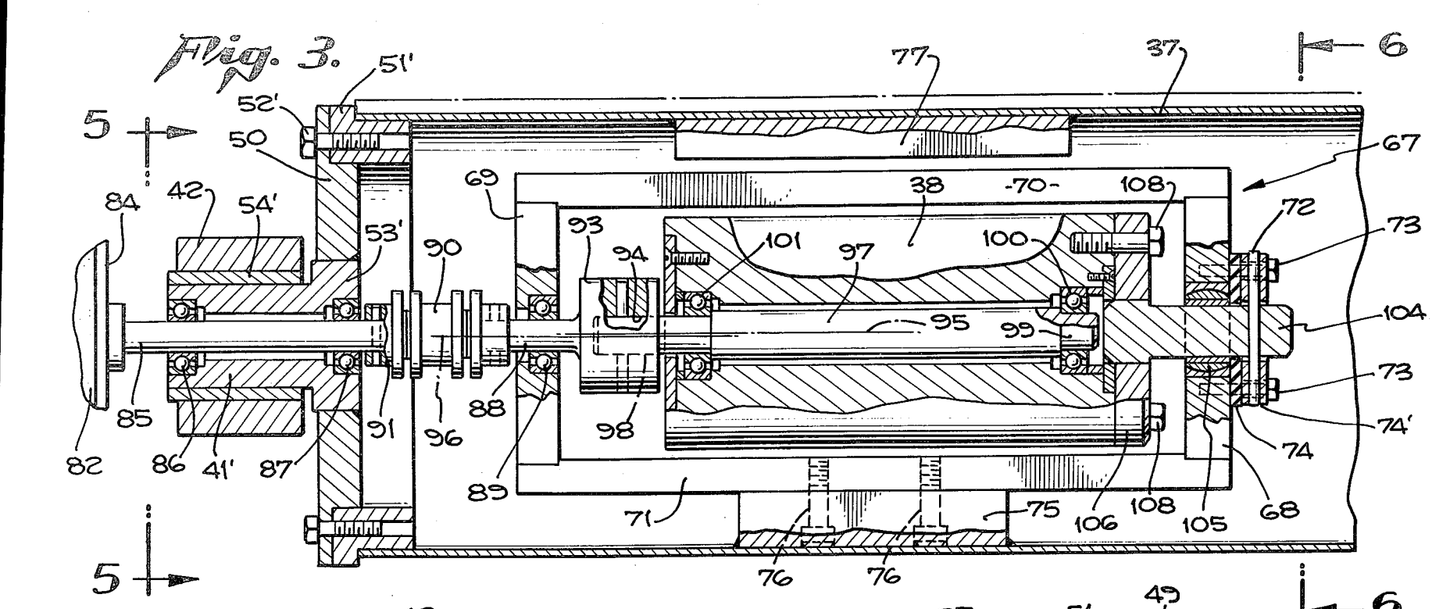
FIG. 3 is a fragmentary longitudinal sectional view on the line 3—3 of FIG. 2.

On the left hand side a sleeve shaft 41' as shown in FIG. 3 is rotatably supported in a similar pillow block 42.

The exterior cylindrical roll 37 is adapted to be driven by a motor 43 at a rate of rotation such that the circumferential speed of the exterior cylindrical roll 37 equals the linear speed of travel of the belt 10. The motor 43 is carried by a suitable bracket 44 on one side of the pillow block 40. A drive pulley 45 on a drive shaft 46 acting through a drive belt 47 and driven pulley 48 on the driven shaft 39 provides the means of rotation.

Figure 4:
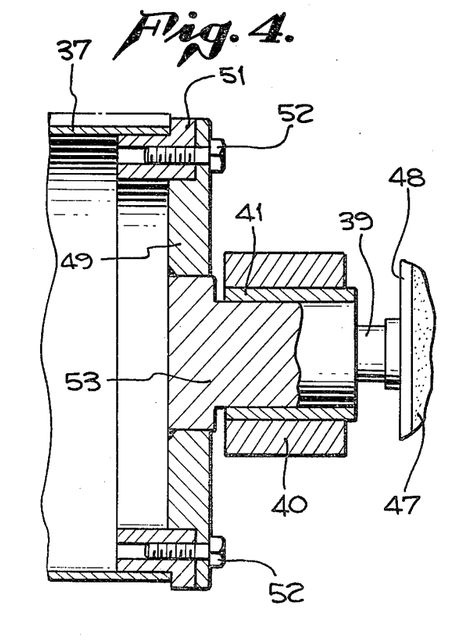
FIG. 4 is a fragmentary longitudinal sectional view on the line 4—4 of FIG. 2.

A header 49, bolted to a flange 51 by bolts 52 comprises end structure for the exterior cylindrical roll 37, as shown in FIG. 4. The header 49 is welded to a flange 53 of the driven shaft 39.

Similarly, at the left hand end of the exterior cylindrical roll as shown in FIGS. 2 and 3, a header 50 bolted to a flange 51' by means of bolts 52', carries the adjacent end of the exterior cylindrical 37. Here also the header 50 is welded to a flange 53' having a bearing support sleeve shaft 41' which rotates within a bearing 54' in turn carried by the pillow block 42.

Figure 5:
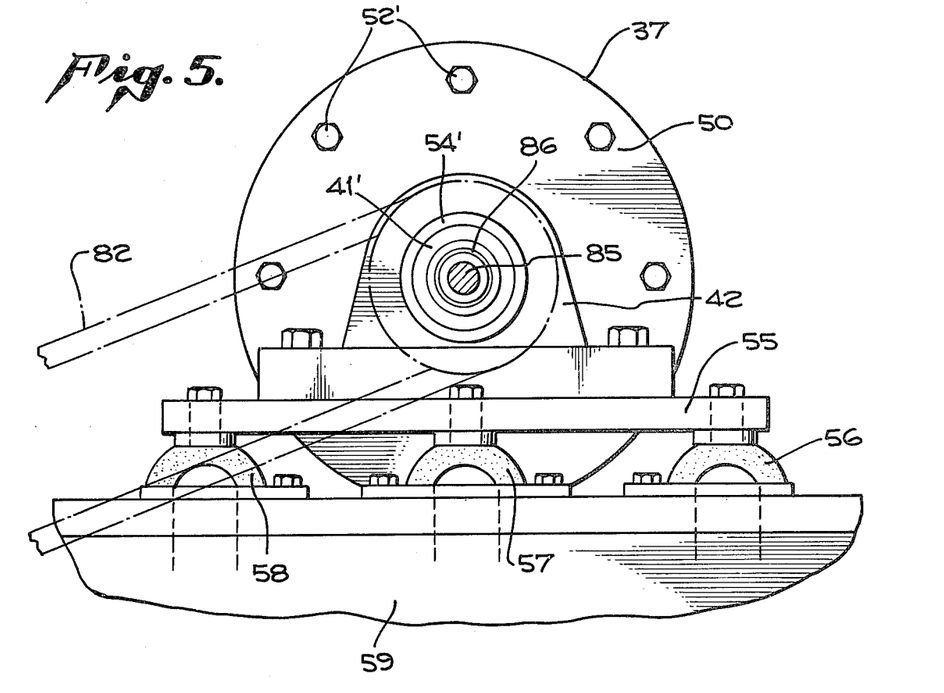
FIG. 5 is an end elevational view on the line 5—5 of FIG. 3.

As shown particularly in FIG. 5, the pillow block 42 is carried by a base 55, in turn mounted on three oscillating shock mounts 56, 57 and 58. The shock mounts in turn are attached to an appropriate supporting support 59. The pillow block 40 at the right hand end is mounted in the same fashion on the stationary support 59.

Figure 6:
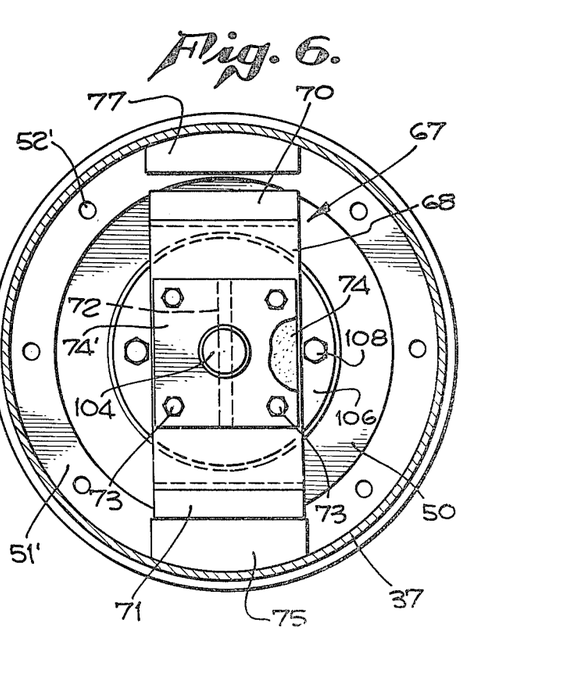
FIG. 6 is a cross sectional view on the line 6—6 of FIG. 3.

In order to provide a driving connection between the driven shaft 39 and the exterior cylindrical roll 37 the driven shaft 39, supported by the bearing 41 in the pillow block 40 as shown in FIG. 4 is anchored to the exterior cylindrical roll 37 at the flange 49. An end view of the frame is shown in FIG. 6. The frame 67 consists of end plates 68 and 69 and side plates 70 and 71. A pin 72, anchored to the stub shaft 104 is retained by resilient cushions 74 which are bolted to the end plate 68 by means of bolts 73 which by design prevents the generator from rotating. A pad 75 welded to the interior of the exterior cylindrical roll 37 at a resonant antinodal point 37' (see also FIGS. 9 and 10) is attached by means of bolts 76 to the side plate 71 of the frame 67. By the means just described there is a direct attachment between the driven shaft 39 and the exterior cylindrical roll 37. A counterbalance mass 77 equal in weight to the weight 75 is attached to the side of the exterior cylindrical roll opposite from the pad 75 so that there will be a perfect balance.

For driving the generator roll 38 there is provided a generator motor 80, shown in FIGS. 1 and 2, on an appropriate support 81. A drive belt 82 extends from a drive pulley 83 to a driven pulley 84 attached to a driven shaft 85. The driven shaft 85 is rotatably supported in bearings 86 and 87 in the sleeve 41' as shown in FIG. 3.

For interconnecting a stub shaft 88, in turn rotatably mounted in the end plate 69 by means of a self aligning bearing 89, there is provided a double flexing disc coupling 90. A bushing 91 is attached to the driven shaft 85 and a similar bushing 92 is attached to the stub shaft 88, as shown in FIG. 3.

On the stub shaft 88 is an eccentric flange 93 containing a pocket 94. Of special note is the fact that the center line 95 of the pocket 94 is slightly eccentric with respect to the center line 95 of the assembly.

A frequency generator shaft 97 with its axis of rotation substantially eccentric with the axis of rotation of the exterior cylindrical roll 37, has its left reduced end portion 98 received in the eccentrically located pocket 94 and the right reduced end portion 99 rotatably supported in a bearing 100 in the right end of the generator roll 38 as shown in FIG. 3. A bearing 101 rotatably supports the left reduced end portion 98 in the corresponding left end of the generator roll 38.

From the foregoing description, it will be clear that the exterior cylindrical roll has a drive separate and apart from the drive for the generator tube 38. The drives in point of fact are entirely independent of each other and subject to independent adjustments as occasion may require. They are consequently able to operate at different speeds and even, if need be, in opposite directions.

In the structure as described, the output of the generator is a function of its mass times the selected eccentric throw. Therefore the generator tube 38, together with its frame 67, should have a mass which exceeds the mass of the resonant exterior cylindrical roll 37. The cylindrical roll 37 should preferably be of relatively stiff, but flexible metal, and of relatively thin wall construction.

To make provision for the eccentric feature there is provided a self-aligning bearing 105 on a stub shaft 104 and the end plate 68 of the frame 67 as shown in FIG. 3. Action of the self-aligning bearing coupled with action of the isolating cushion 74 permits the left end of the generator roll 38 to oscillate within the frame 67 and also to oscillate with respect to the right end but not to rotate. The motion of the roll 38 thus produced can aptly be described as conical with the apex of the cone at the self-aligning bearing 105 and the base of the cone at the end of the shaft 95 where it is received in the pocket 94.

As shown in FIG. 3 a disc 106 is welded to the stub shaft 104 and is bolted to the corresponding end of the generator roll 38 by means of the bolts 108.

In operation with the exterior cylindrical roll 37 being rotated in a counterclockwise direction as viewed in FIG. 1 in order to travel with the belt 10 the driven shaft 85 is rotated on a contrary direction, namely clockwise.

The function of the sinusoidal frequency generator is to produce and transmit a sinusoidal frequency force output of sufficient amplitude to excite the exterior resonant roll into one of its nodal resonant frequencies by design. To accomplish this the basic design elements consist of the mass of the generator roll 38, its driven eccentric 93, its driven generator shaft 97, its supporting frame 67 and its supporting and transmission pad 75.

The stud shaft 88 of eccentric 93 is driven and rotated by the driven shaft 85. The generator shaft 97 is rotated about its eccentric produced by the off-set bore in the eccentric 93. Since the outboard mass of the generator roll 38 is secured to frame 67 at flange 72, the mass is not free to rotate, however it is forced to oscillate about its rotating generator shaft 97. Thus for each rotation of the shaft 97 there is produced one single complete oscillation of the roll 38 about its eccentric generator shaft 97. The amplitude of the oscillating mass is equal to the eccentric throw of the shaft. The motion produced by the oscillating mass is conical in shape with the base of the cone being located at the eccentric position and the apex of the cone being at the opposite self-aligning bearing 105.

The sinusoidal energy produced by the oscillating force motion is released at the self aligning bearing 89 which is mounted within frame 67. Should the force produced at bearing 89 be plotted as a function of time, a true sinusoidal curve per revolution would result. The frequency would be the speed of the shaft 97, and the amplitude would be function the mass times the eccentric throw. Thus the generator functions as a true sinusoidal mechanical frequency generator which was specifically designed to insure successful operation of the overall structure. It is significant to this invention that since the mass of the roll 38 is not rotating, little or no centrifugal force is generated or released. Any appreciable centrifugal force transmitted to the structure could be highly detrimental.

The sinusoidal energy frequency is released to frame 67 from the generator roll and then transmitted by the supporting pad 75 and to the outer resonant roll where that roll in turn and by design, is excited into one of its resonant nodal frequencies.

Figures 8, 9, 10, 11:
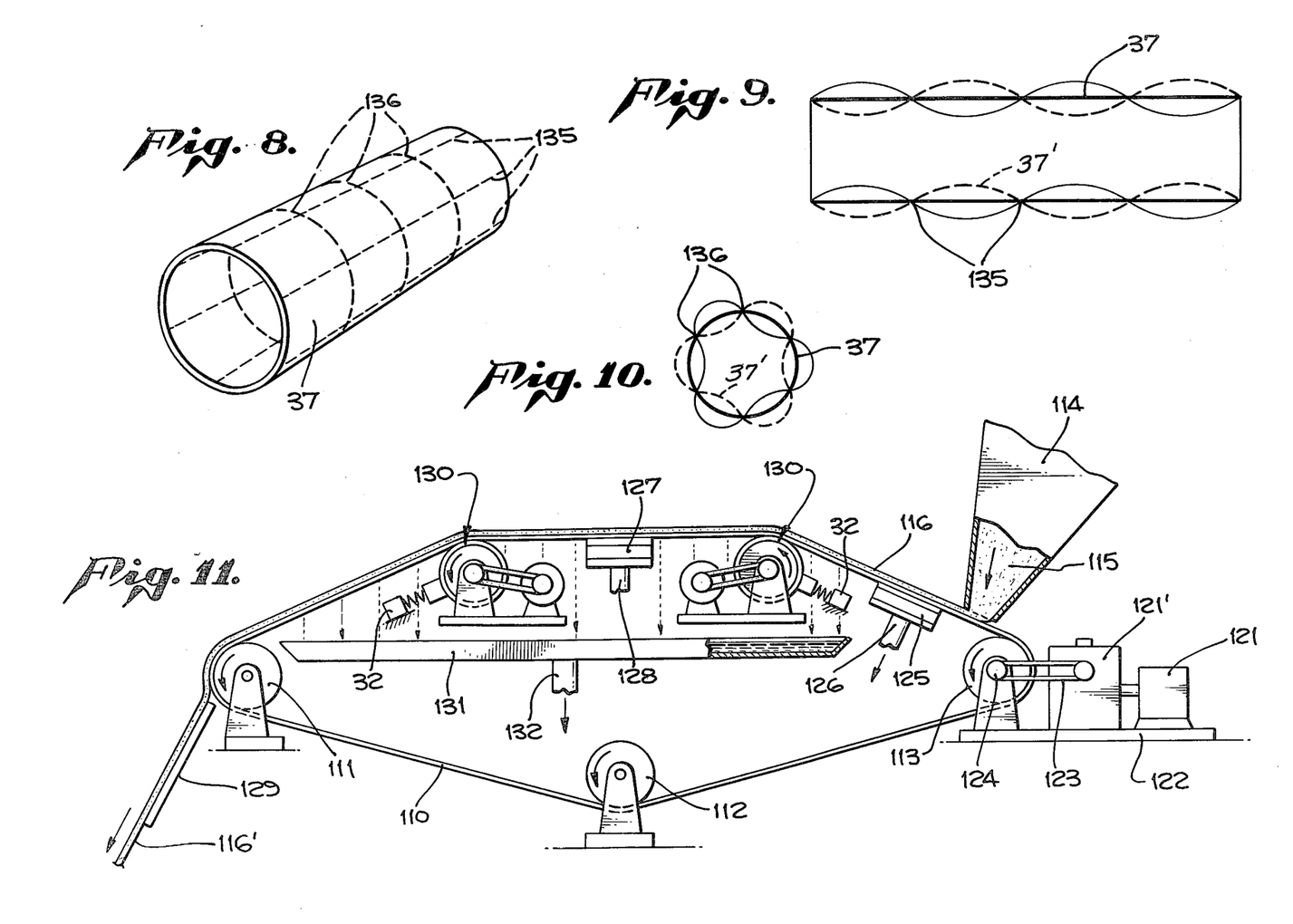
FIG. 8 is a side perspective view of the resonant exterior cylindrical roll showing the location of the nodal wave pattern.
FIG. 9 is a side elevational view of the resonant exterior cylindrical roll showing the longitudinal sinusoidal nodal wave pattern.
FIG. 10 is an end elevational view of the resonant exterior cylindrical roll showing the sinusoidal nodal wave pattern.
FIG. 11 is a schematic representation of another form of the invention.

In the form of invention of FIG. 11 a closed loop screen 110 is supported by idler rollers 111 and 112 and a drive roller 113. As in the first described form of the invention there is provided a hopper 114 for depositing a mass of slurry 115 in the form of a web 116 on the screen 110. A motor 121 and gear reducer 121' on a support 122, acting through a belt drive 123 serves to rotate a driven shaft 124 of the drive roll 113. A suction box 125 in communication with a conduit 126 serves to draw off initial quantity of liquid which comprises a substantial portion of the slurry 115. There is a second suction box 127 served by a conduit 128 for a comparable purpose. A defluidized portion 116' of the web 116 rides down a sluice 129 to a suitable accumulating station (not shown).

In this form of the device there are two generator assemblies 130 which are substantially identical in construction and operation with respect to the generator assembly described in connection with FIG. 1. These generator assemblies 130 when activated serve to increase the extraction of liquid through the closed loop screen 110 from which it falls to a tray 131 from which it is conducted to a conduit 132.

In the form of device of FIG. 11 when the suction box 126 has operated to remove free fluid from the web 116 action of the resonant shell of the generator assembly 130 during its deliquifying operation extracts and releases additional fluid from the material of the web. Thereafter action of the second suction box 127 is made more effective for extracting an additional amount of liquid from the material of the web. Following this action of the second resonant shell of the generator assembly 130 continues to extract still an additional quantity of liquid. The showing of FIG. 11 for a twin pair of resonant generator assemblies and suction boxes is by way of example only in as much as these mutually contributing deliquifying agencies namely the suction box and the resonant generator assembly can be installed in triple or quadruple arrangements as long as the installation of the additional devices continues to extract an amount of liquid thus to be saved which warrants the expense and operation of the multiple arrangement.

Figure 7:
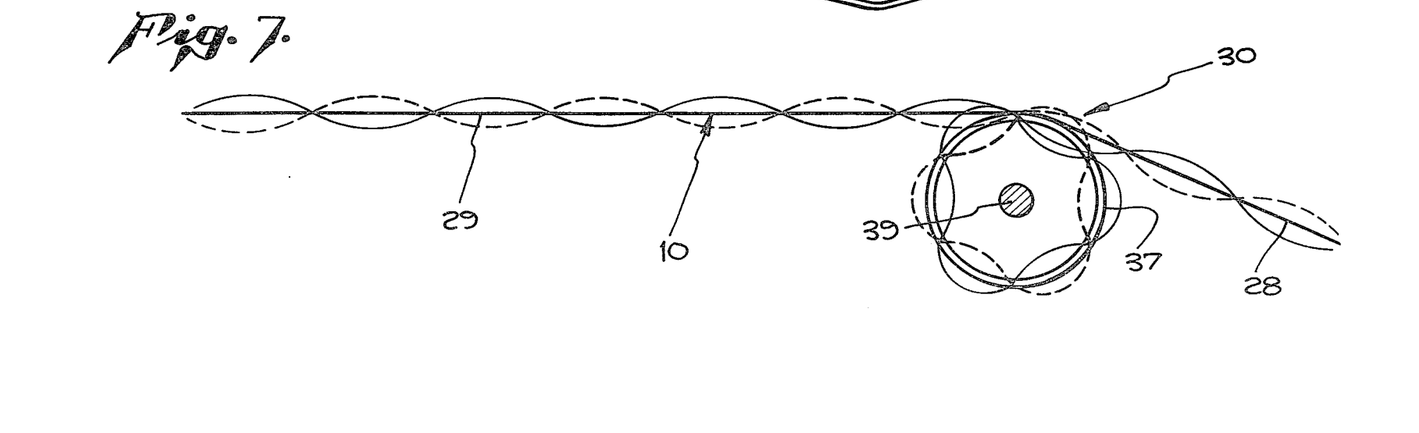
FIG. 7 is a schematic view of a resonant pourous belt screen and assembly showing the sinusoidal nodal wave pattern.

For a better understanding of the action of the generator assembly 30 by way of example FIG. 7 shows the exterior cylindrical roll in resonance and the manner in which the wave pattern set up in the roll is transmitted to and carried by adjacent web sections 28 and 29.

In FIG. 8 there is illustrated on the exterior face of the exterior cylindrical roll 37 circumferential nodes 135 and axial nodes 136. FIG. 9 shows the axial node pattern 135 and FIG. 10 the circumferential node pattern 136, in exaggerated form so as to illustrate the direction of the effect of resonant frequency of the two types of nodes made reference to.

For a roll like the exterior cylindrical roll 37, for example, to be resonant it should be of resilient stiff material with a modulus of elasticity in the range of from about 30,000,000 to about 21,500,000 or slightly lower. This is recognizably the range for metallic materials such as steel, stainless steel, nickel, alloys of copper and perhaps some of the harder alloys of aluminium with the possible inclusion of some specially constituted nonmetallic materials. The stability inherent in the metallic materials is a highly desireable characteristic. Materials such as soft rubber or fiber reinforced rubber, or comparable pliable synthetic materials of which various hoses have been made, and even phenolics with a modulus of 500,000, are clearly outside the required range and could not resonate in the ultrasonic range.

Since the resonant character of the roll on which the transducers are mounted is appreciably significant, as well as the location of the transucers at resonant frequency antinodal points a typical installation can be calculated.

The exterior resonant roll 37 of the assembly 30 is specifically designed for one of its desired modes of resonant frequency as illustrated, for example, in FIG. 9. The pad 75 which supports the sinusoidal frequency generator roll 38 and its frame 67 is mounted at one of the longitudinal antinodal frequency points of the resonant roll 37 as illustrated, for example, by 37' of FIG. 9.

Because of known properties of the resonant roll material, the desired tube length and the exiting mass and frequency of the frequency generator, etc., the thickness of the resonant roll may be calculated with sufficient accuracy to comply with the resonant characteristics desired for its design.

It is significant to understand that the consistency of the pulp and water mixture in the pulp feed box 11 is approximately 95 percent water and 5 percent pulp fibers. The fibers vary in length depending on requirements to approximately 8 millimeters in length and are usually made from collulose material, although in some cases a small supplement of synthetic material such as rayon may be blended with the material.

The cellulose pulp and water mixture is fed evenly across the feed end of the moving belt on screen 10 which forms web 27 of approximately ⅛ inch thickness for paper making. The screen speed in paper making may reach speeds of 1200 ft./min. The suction box is located at a distance downstream from the pulp feel box 11 and is located beneath and on contact with and positioned across the screen. The suction box with its associated vacuum equipment is generally known to extract a quantity of water from the web leaving a consistency of 70 percent water and 5 percent pulp to be dried by the dryers.

It is worth observing therefore that the cost of drying the sheet in the dryers at the screen speeds heretofore mentioned is a major cost in paper making and any significant amount of additional water that could be removed from the web at the screen location would result in a major energy cost savings.

The paper making industry urgently needs a further means of extracting additional fluid from the web in contact with the moving screen.

The problem in extracting additional water from the web by means of a suction box occurs largely because the surface tension that exists between the fibers and the water is not broken, thus not allowing the water to be free to move and drain from the cellulose material. Another limiting factor arises since during the suction and vacuum process there is no agitation or dispersion that takes place within the cellulose web material and as a result the fibers are compacted on the screen thus preventing any more water from being drawn from the web as a result. Multiple or additional suction boxes have been found not to be effective. The issuance of the invention herein disclosed is to provide a new and indefinitive device based on new technology which will extract additional fluid from the web after vacuuming has taken place.

The structure of the web deliquifying roll device for a paper machine screen provides a novel means for generating high energy kinetic reaction within the web cellulose fluid medium, resulting in the formation of an intense field of acoustical vaporous cavitation within the web which has a consistency of approximately 70 percent water and 5 percent fibers.

The apparatus providing the means for generating vaporous cavitation is furthermore based on the technology of resonant structures. The apparatus consists in part of a sinusoidal frequency generator or exciter which is mounted within a revolving, free-free, resonant spring mass structure in the form of a cylindrical shell such as the roll 37 and which shell is in contact with, and serves as, a supporting element for a moving paper machine screen. The application of the revolving resonant cylindrical shell in the form of a roll has been shown in FIG. 1.

The free-free cylindrical roll 37 is specifically designed to one of the desired axial and circumferential nodal frequencies that have been initially selected for the structure. The fundamental exciting frequency to be selected for design for said application covers a range of approximately 500–2000 cycles per second. Some of the basic chosen parameters required for design include in part the speed of the generator, length and diameter of shell, thickness of shell, material and modulus of elasticity of shell, mass of shell, mass of generator, and loading on shell. FIG. 8 shows an example of the axial and circumferential nodal patterns of natural frequency referred to.

FIG. 7 shows the revolving cylindrical shell as applied to a moving screen and illustrates the loading and transfer of sinusoidal resonant frequency energy to the screen structure.

The resonant cylindrical roll makes contact with and supports the wrap-around screen as shown, and the area of contact represents that portion of the roll surface which transfers its energy to the screen and its web. The screen is identified technically as a free-free structure between its supports or where suspension takes place between the cylindrical roll and the adjoining roll supports. The screen is generally adjusted to a tension value of 175 pounds which provides an acceptable stiffness factor. The amplitude of the resonant natural frequency that has been transmitted to the screen sections on either side of the cylindrical roll in turn excites the screen sections into one of the nodes of the screen's natural frequency. The combined resonant system therefore consists of the resonant roll and significant portions of the screen both upstream and downstream from the roll position.

The resonant cylindrical roll in contact and in combination with the resonant screen sections comprises a combination of two structures which are each free-free and which are excited sinusoidally and individually into one of their own nodes of natural frequency.

The longitudinal and circumferential elastic wave energy at resonance and thus released from the cylindrical shell causes very intense compressional sinusoidal wave energy to be transmitted in perpendicular fashion from the outer roll surface to the screen where it is in contact with the roll and to continue through the pulp fluid, or slurry mixtures, as the case may be, which forms the web. The speed of the compressional wave energy within the impure pulp mixture is estimated to be 5500 feet per second. Shearing forces of the compressional wave energy traveling through the web fluid cause a very high degree of kinetic reaction to take place within the pulp fluid mixture which in turn ruptures the fluid into a known energy namely vaporous cavitation which is a commonly accepted term for such a condition.

The vaporous cavitation energy field is continuously subjected to alternating positive and negative pressure cycles which cause minute bubbles of a few microns in diameter to be formed in the pressure cycles and to be collapsed on the negative cycles causing a very intensive vacuuming action on all of the surfaces thus contacted and including the cylindrical roll surface and screen surfaces.

Such energy life cycle transformations take place each $10^{-9}$ of a second and form elipsoid energy patterns in three planes which are continuously in a state of formation and collapse. It is during the negative pressure or collapse phase of the energy cycle that voids are produced, as are also vapor cavities in the solution. This in turn produces a very intense vacuuming action on the surfaces of the screen and cellulose fiber material, sometimes referred to as an implosion effect. The implosions which take place on the surface of the cylindrical roll, the surface of the screen and the fibers cause the respective surface tensions to be broken and permit the water or other fluids to be released and thus flow freely and rapidly through the screen to the resonant surfaces. The procedures made reference to produce the maximum vacuuming affect, these being designated as the resonant cylindrical roll surface and both surfaces of the resonant screen.

The fluid portion of the web is thus freed from the web materials and flows at very high velocity downward through the screen to the resonant roll surface and to the bottom of the adjacent screen sections. The fluid ultimately falls to the tray 35 placed below for collection and return of the fluid to the process.

Release of the fluid is by gravity, the longitudinal elastic wave motion energy of the roll and screen, and the screen vacuuming action caused by cavitation.

The web deliquifying roll for fluid extraction from processed materials may also be applied to other processes such as for example mining and chemical processing. FIG. 11 illustrates a similar application of apparatus for extraction of metal bearing fluids from denuded ore in the mining industry and for extraction of chemicals from residue in the chemical processing industry. In either case the amount that is currently extracted by the suction method above represents an approximate amount of 30 percent. Additional extraction beyond this amount realized by operation of the invention is 13 to 25 percent. The further extraction of fluids represents considerable saving of both mineral bearing fluids and chemicals which are currently lost to the tailing dumps. In addition significant cost savings in the drying process is realized.

FIG. 11 shows a dual resonant roll installation for fluid extraction whereby an additional amount of 10 to 12 percent may be extracted in similar fashion. The alternate modification shown in FIG. 11 illustrates the addition of a second suction box to the screen for further extraction. Further extraction is accomplished since the first resonant roll has eliminated the compactness of the web materials caused by the first suction box and furthermore the surface tension of the materials have been broken and the fibers or other materials contained in the web have been severely dispersed.

The resonant roll assembly is customarily located below and in contact with the screen. Approximately 20 to 30 percent of the roll surface is in contact with the screen which has a tension of approximately 170 lbs. The roll assembly is supported by outboard pillow block shaft bearings and the roll is free to revolve or spin independently with respect to its internal driven generator assembly. The roll may be rotated simply by contact motion with the screen or it may, as in the case of a paper machine application, be rotated by means of the extended stub shaft which is driven by external power at an RPM such that the roll surface speed will be synchronous to the screen speed.

The sinusoidal frequency generator which is mounted within the roll assembly at the opposite end, is independently driven by its own extended shaft 85 which is powered by the external motor drive assembly 80. The roll assembly 30 or 130, as the case may be, which is supported by its pillow block bearings at either end is mounted on an intermediate structure at either end, which in turn is isolated from the supporting pedestals by a series of resilient isolation mounts as shown in FIG. 15.

The cylindrical roll is supported and brazed in place at either end of the roll to slip on flanges. The flanges in turn are tightly fitted to external mating flanges at either end, and secured in place by bolts. The outboard flange has an extended stub, step-shaft shown in FIG. 3. The first step portion of the shaft is assembled to a supporting pillow block bearing which becomes a part of the support structure. The second step portion of the shaft is keyed at the end to hold the pulley which is connected to the external drive mechanism.

The inboard flange has a stub hollow shaft and the shaft is assembled to a pillow block support bearing which also becomes a part of the supporting structure.

The sinusoidal frequency generator assembly embodied in the generator tube 38 (within the concentric frame 67 is mounted and centered within the cylindrical roll, adjacent one end of the roll, as shown in FIG. 2. The eccentric extension shaft of the eccentric, as shown in FIGS. 2 and 3 is connected to the high speed double flexing disc self-aligning coupling 90.

Reference is made to FIG. 3 which illustrates the generator assembly and the method of attachment with respect to the cylindrical roll. The design and method of attachment of the generator assembly adds to the versatility of the generator operation as it relates specifically to this invention. For example, the roll part and the extended driven shaft may be rotated and driven independently, either clockwise or counterclockwise, with respect to each other. On the other hand it can also be observed that either part may be in a stationary position while the other is rotated.

In the case of a paper machine application, the roll is driven at a peripheral speed to be synchronous with the screen speed by means of the roll extended shaft. In this instance it can be observed that should the generator extended shaft, be anchored in a fixed position, then the generator is independently driven by the rotating roll by means of its pedestal about its eccentric. In such case the exciting frequency would be equivalent to the RPM of the roll.

In the case of a paper machine application, the generator exciting frequency by design, would usually exceed substantially the roll RPM. In order to obtain the desired operating exciting frequency the extended driven generator shaft is driven opposite in direction to the roll rotation. Under such circumstances the exciting frequency would be the sum of the roll RPM and the generator shaft RPM. On the other hand, should the exciting frequency by design be less than the roll RPM, then the generator would be driven in the same direction as rotation of the roll and in that case the exciting frequency would be the difference of the two respective RPM's.

The frequency generator and its supporting frame are accurately centered within the roll and in line with its longitudinal axis. When in operation the generator and its supporting concentric frame oscillates in conical fashion about the eccentric and centerline axis and in a balanced condition.

For paper machine applications where the roll itself is spinning at relatively high speeds, the roll and assembly must be dynamically balanced. The roll is first balanced statically by means of the counter weight which is located at the opposite inner portion of the shell, opposite the pedestal. The mass of the balance weight is essentially equal to the generator supporting pedestal. Final dynamic balancing of the assembled roll is reformed on a dynamic balancing machine and the correction balance weights are applied to the flanges of the roll.

What is claimed is

1. An apparatus for deliquifying a belt carried fluid suspension of material and separating fluid therefrom comprising an endless porous belt in a path of travel at a selected linear speed, feed means for said material having an outlet adjacent an upwardly directed face of the belt, a collecting means beneath the opposite face of the belt, and a frequency generator assembly, said frequency generator assembly comprising an exterior cylindrical roll with an axis of rotation parallel to said belt and having a circular cross sectional shape with a substantially smooth exterior surface, said exterior surface being in continuous progressive face to face engagement with said opposite face of the belt, said exterior cylindrical roll having a selected resonant frequency, said smooth exterior surface of the roll having a path of travel in the same direction as and corresponding to the path of travel of the belt, a first drive means for said exterior cylindrical roll operable to drive the smooth exterior surface at substantially the same linear speed as said belt, means rotatably supporting said frequency generator assembly, a generator roll member inside and substantially concentric with the exterior cylindrical roll, a generator shaft substantially concentric with the axis of rotation of the exterior cylindrical roll, and a separate drive means for said generator shaft adapted to drive said generator shaft in a selected direction of rotation relative to said exterior cylindrical roll, and at a speed of rotation different from the speed of rotation of said exterior cylindrical roll, an eccentric connection between said generator shaft and said generator roll member peoductive of a sinusoidal vibration condition in said generator roll, said generator roll member having a connection to said exterior cylindrical roll at an antinodal point for one of the modes of resonant frequency of said exterior cylindrical roll, operation of said generator roll member being productive of a sinusoidal vibration condition in said exterior cylindrical roll in the sonic range at resonance, whereby to set adjacent portions of said belt sinusoidally at resonance and excite the material thereon in a condition of cavitation.

2. An apparatus as in claim 1 wherein there are two frequency generator roll assemblies and a suction box in operating association with the belt at a location intermediate said frequency generator assemblies.

3. An apparatus as in claim 1 wherein shock mounts support opposite ends of the frequency generator assembly on a supporting surface.

4. An apparatus as in claim 1 wherein said generator roll member is located more nearly adjacent one end of the frequency generator assembly than the other.

5. An apparatus as in claim 1 wherein said frequency generator assembly comprises interconnected shaft members individually rotatably mounted on a common axis of rotation.

6. An apparatus as in claim 5 wherein generator roll member comprises an elongated frame bearing at one end, a self-adjusting bearing mounting on one of said shaft members and at the other end having an eccentric connection to another of said shaft members.

7. An apparatus as in claim 6 wherein there is a source of rotation for said generator roll member and a flexible connection between said generator roll member and said source of rotation.

8. An apparatus as in claim 1 wherein said generator roll means comprises an eccentric shaft means and a frame encompassing said eccentric shaft means, said frame having an anchoring attachment to the exterior cylindrical roll and there is a balance weight on the exterior cylindrical roll in balanced relationship with said anchoring attachment.

9. An apparatus as in claim 1 wherein said generator roll member comprises a shaft means having an eccentric mounting at only one end, a frame encompassing said shaft means, the eccentric mounting being partly in said frame and partly in said shaft means, said frame having an anchoring attachment to the exterior cylindrical roll at said antinodal point.

10. An apparatus as in claim 1 wherein said opposite face of the belt has contact with said exterior surface of the exterior cylindrical roll far from about 20% to 30% of the surface of said exterior cylindrical roll.

11. An apparatus as in claim 1 wherein said adjacent portions of the belt which are sinusoidally at resonance extend throughout a substantially horizontal section between two horizontally spaced supports and there is a collecting tray for said fluid extending beneath and substantially throughout the length of said substantially horizontal section.

12. An apparatus as in claim 1 wherein the mass of the exterior cylindrical roll is substantially less than the mass of the generating roll member.

13. A method for extracting liquid from a liquid suspension of material wherein the material is carried on one face of an endless porous belt traveling at a selected speed over a collecting means and in operative engagement with a frequency generator assembly having an outer cylindrical belt engaging surface portion and an inner rotating generator, said method comprising continually and progressively rolling the belt engaging surface portion of the frequency generator assembly against a face of the belt opposite to the face thereof which carries the material, driving said belt engaging surface portion rotationally at a linear speed substantially equal to a selected linear speed of travel of the belt, fastening said inner rotating generator to said belt engaging surface portion at a frequency antinodal point and applying a separate rotating force to said inner rotating generator thereby to impart to said frequency generator assembly a sinusoidal force motion exciting said frequency generator assembly into one of its modes of natural frequency, transmitting said sinusoidal force motion substantially at resonance to portions of the belt in engagement with said belt engaging surface portion and to the material on said belt thereby producing cavitation to break the fluid tension and accelerate the passage of fluid through the belt to the collection means.

14. The method of claim 13 including applying the sinusoidal force motion to the roll assembly at a location nearer one end than theother.

15. The method of claim 13 including setting the speed of travel of the belt at between about 10 to 1200 feet per minute.

16. The method of claim 13 including making use of acoustical vaporous cavitation to produce a breakage of fluid tension in the fluid material.

17. The method of claim 13 including creating a nodal arrangement of the wave pattern in the frequency generator assembly in both a longitudinal and a circumferential direction.

* * * * *